(12) United States Patent
Harada

(10) Patent No.: US 7,610,246 B2
(45) Date of Patent: Oct. 27, 2009

(54) INFORMATION PROCESSING APPARATUS, CONTROL METHOD THEREFOR AND COMPUTER READABLE INFORMATION RECORDING MEDIUM

(75) Inventor: Toru Harada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 544 days.

(21) Appl. No.: 11/362,160

(22) Filed: Feb. 27, 2006

(65) Prior Publication Data

US 2006/0200421 A1 Sep. 7, 2006

(30) Foreign Application Priority Data

Mar. 4, 2005 (JP) ............................. 2005-061671
Feb. 15, 2006 (JP) ............................. 2006-038543

(51) Int. Cl.
*G06Q 99/00* (2006.01)
(52) U.S. Cl. ............................. 705/59; 705/51; 705/57; 705/58; 726/26; 380/200
(58) Field of Classification Search ............ 705/50–59; 380/200; 726/26
See application file for complete search history.

(56) References Cited

U.S. PATENT DOCUMENTS

| | | | |
|---|---|---|---|
| 6,898,708 B2 * | 5/2005 | Hori et al. ............ | 713/171 |
| 7,171,662 B1 * | 1/2007 | Misra et al. ............ | 717/177 |
| 2002/0026424 A1 * | 2/2002 | Akashi ............ | 705/57 |
| 2004/0187008 A1 | 9/2004 | Harada et al. | |
| 2004/0254888 A1 * | 12/2004 | Tanaka et al. ............ | 705/59 |
| 2009/0052662 A1 * | 2/2009 | Oxford ............ | 380/43 |

FOREIGN PATENT DOCUMENTS

| | | |
|---|---|---|
| JP | 2001-306170 | 11/2001 |
| JP | 2004-110779 | 4/2004 |
| JP | 2004-303210 | 10/2004 |

OTHER PUBLICATIONS

Iannella, Renato, "Digital Rights Management (DRM) Architectures", Jun. 2001, D-Libe Magazine, vol. 7, No. 6.*

* cited by examiner

*Primary Examiner*—Jalatee Worjloh
(74) *Attorney, Agent, or Firm*—Oblon, Spivak, McClelland, Maier & Neustadt, L.L.P.

(57) ABSTRACT

An information processing apparatus handling a removable formation recording medium storing predetermined substance information and first license information concerning the information processing apparatus includes a storing part storing second license information concerning the removable information recording medium, a license checking part carrying out checking of license information with the use of at least one of the first license information and the second license information, and a substance information usage allowability control part controlling, based on a result of the checking carried out by the license checking part, allowability for usage of the predetermined substance information from the removable information recording medium.

8 Claims, 18 Drawing Sheets

FIG.3

LICENSE INFORMATION

1

EXECUTION PROGRAM NAME

TARGET DEVICE IDENTIFICATION NUMBER

2

EXECUTION PROGRAM NAME

TARGET DEVICE IDENTIFICATION NUMBER

⋮

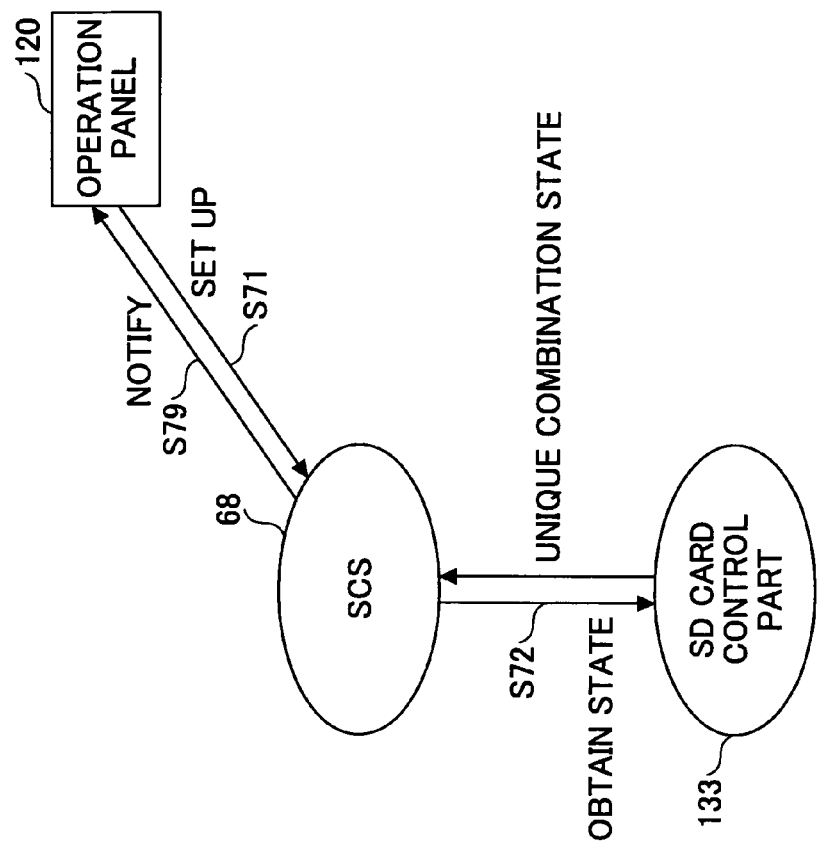
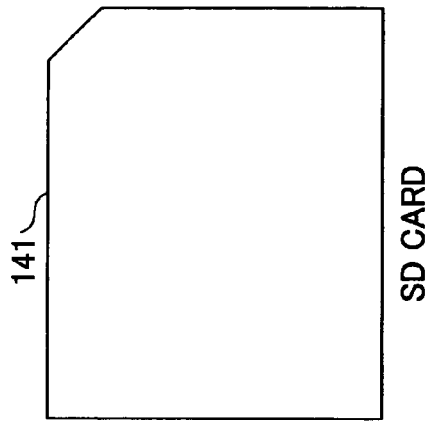
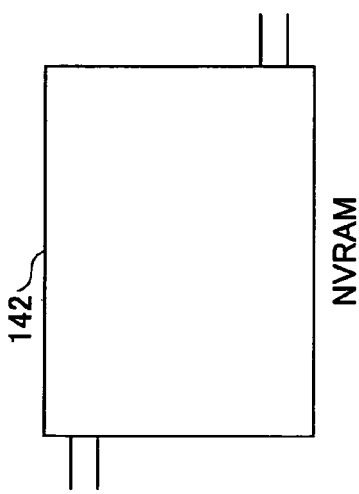
FIG. 17

INFORMATION PROCESSING APPARATUS, CONTROL METHOD THEREFOR AND COMPUTER READABLE INFORMATION RECORDING MEDIUM

BACKGROUND OF THE INVENTION

1. Field of the Invention

The present invention relates to an information processing apparatus, a control method therefor, and a computer readable information recording medium.

2. Description of the Related Art

Conventionally, information processing apparatus uses an information recording medium removably loaded therein in which predetermined substance information such as application software is stored. For example, a printer uses a removable information recording medium such as an SD card storing a program for adding a function. Recently, such a removable recording medium is used in common among plurality of types of apparatuses. An image forming apparatus, which handles such a removable information recording medium storing a program or such has been proposed (for example, in Japanese Laid-open Patent Application No. 2001-306170) in which illegal copy of a program or illegal use thereof is inhibited. Further, an image forming apparatus which handles such a removable information recording medium storing a program or such has been proposed (for example, in Japanese Laid-open Patent Application No. 2004-110779) in which a program can be easily started up.

Japanese Laid-open Patent Application No. 2004-303210 also discloses a related art.

SUMMARY OF THE INVENTION

As a result of usage of an information recording medium storing substance information among a plurality of types of information processing apparatuses being allowed, occasions in which illegal copy or illegal usage may be made increases. Countermeasures thereto have been proposed in Japanese Laid-open Patent Application No. 2001-306170, and so forth. However, further effective countermeasures are demanded.

An object of the present invention is to effectively control usage of a removable information recording medium.

An information processing apparatus according to a first aspect of the present invention, utilizing a removable information recording medium storing predetermined substance information and first license information concerning the information processing apparatus, includes: a storing part storing second license information concerning the removable information recording medium; a license checking part carrying out checking of license information with the use of at least one of the first license information and the second license information; and substance information usage allowability control part controlling, based on a result of the checking carried out by the license checking part, allowability of a usage of the predetermined substance information from the removable information recording medium.

In an information processing apparatus according to a second aspect of the present invention, in the information processing apparatus according to the above-mentioned first aspect of the present invention, the first license information concerning the information processing apparatus comprises identification information uniquely indicating the information processing apparatus; the second license information concerning the removable information recording medium comprises identification information uniquely indicating the removable information recording medium; the license checking part checks the license information by using at least one of the identification information uniquely indicating the information processing apparatus of the first license information and the identification information uniquely indicating the removable information recording medium of the second license information, and the substance information usage allowability control part does not allow a usage of the predetermined substance information from the removable information recording medium when the checking made by the license checking part results in failure.

An information processing apparatus according to a third aspect of the present invention, in the information processing apparatus according to the above-mentioned first aspect or the second aspect of the present invention, further includes a license information adding part configured to newly add license information to at least one of the removable information recording medium and the storing part of the information processing apparatus.

In the configuration of the first aspect of the present invention, the information processing apparatuses, among which usage of the predetermined substance information from the readable information recording medium is allowed, can be limited. Accordingly, a usage of the predetermined substance information can be easily and effectively controlled.

In the configuration of the second aspect of the present invention, an illegal usage of the removable information recording medium can be positively avoided.

In the configuration of the third aspect of the present invention, license information may be added to the removal information recording medium and/or the information processing apparatus as is necessary.

BRIEF DESCRIPTION OF THE DRAWINGS

Other objects and further features of the present invention will become more apparent from the following detailed description when read in conjunction with the accompanying drawings:

FIG. 3 shows a data structure of license information stored in a removable information recording medium;

FIGS. 16 and 17 show flows of setting up operation of the multifunction machine of FIG. 10.

DETAILED DESCRIPTION OF THE PREFERRED EMBODIMENTS

Embodiments of the present invention will now be described with reference to figures.

Figure 1:
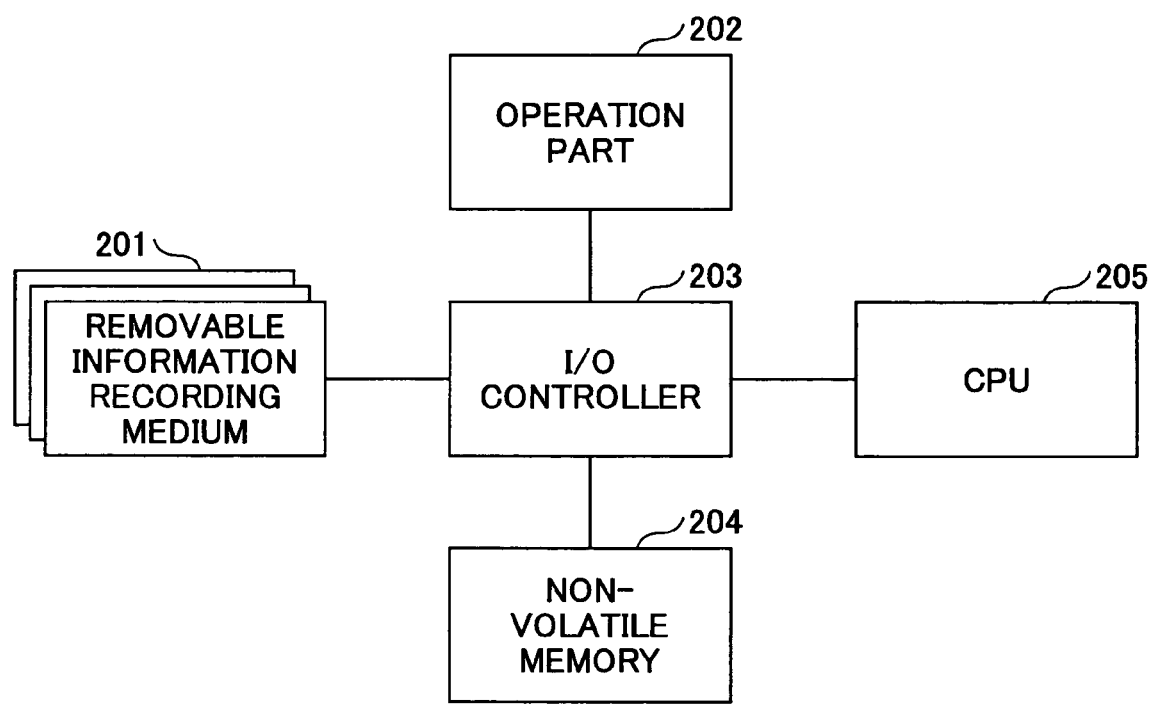
FIG. 1 shows a block diagram illustrating a hardware configuration of an image forming apparatus according to one embodiment of the present invention.

FIG. 1 shows a block diagram of a hardware configuration of an image forming apparatus as one example of an information processing apparatus according to one embodiment of the present invention.

In FIG. 1, 201 denotes a removable information recording medium storing an execution program such as a firmware as predetermined substance information. The recording medium 201 is, for example, an SD card, a memory stick or such, and is configured to be inserted into and removed from the image forming apparatus. 202 denotes an operation part providing an interface for providing a function to an operator, notifying the operator of a state of the machine, or such. 203 denotes an I/O controller, which is a device for controlling input/output of information from/to the outside via the removable information recording medium 201, a UI (user interface) or such. 204 denotes a non-volatile memory for storing information concerning a state of the image forming apparatus or such. The non-volatile memory 204 holds information stored therein after power supply thereto is turned off. 205 denotes a CPU, which controls execution of a program such as the firmware from the removable information recording medium 201.

Figure 2:
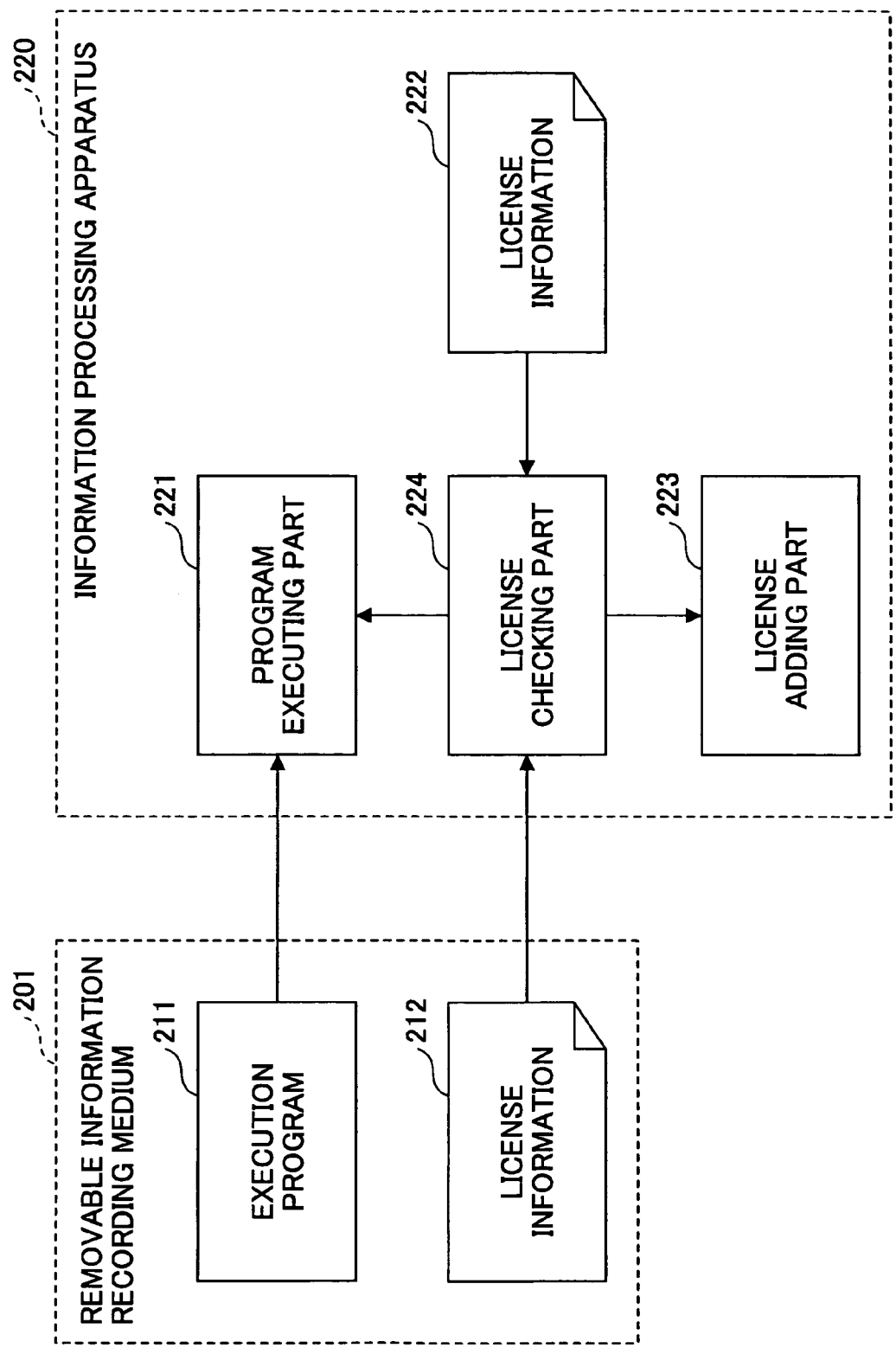
FIG. 2 shows a block diagram illustrating a software configuration of the image forming apparatus according to the embodiment of the present invention.

FIG. 2 shows a block diagram illustrating a software configuration of the image forming apparatus according to the embodiment of the present invention described above.

In FIG. 2, 221 denotes the execution program stored in the removable information recording medium 201, which is the firmware, for example, providing a function to the image forming apparatus. 212 denotes license information stored in the removable information recording medium 201. 220 denotes an information processing apparatus such as a computer including the CPU 205 provided in or acting as the image forming apparatus described above.

In the information processing apparatus 220, 221 denotes a program executing part executing the execution program 211. 222 denotes license information stored in the non-volatile memory 204. 223 denotes a license adding part adding license information. 224 denotes a license checking part carrying out a checking process for checking the license information 212 of the removable information recording medium 201 and the license information 222 of the non-volatile memory 204.

FIG. 3 shows a data structure of the license information 212 stored in the removable information recording medium 201. It is noted that the license information 222 stored in the non-volatile memory has the same data structure.

In FIG. 3, the license information 212 includes, for respective ones of a plurality of execution programs #1, #2, #3, . . . , stored in the removable information recording medium 201, execution program's names and target devices' identification numbers.

Next, operation of the image forming apparatus having the above-described configuration will be described.

Figure 4:
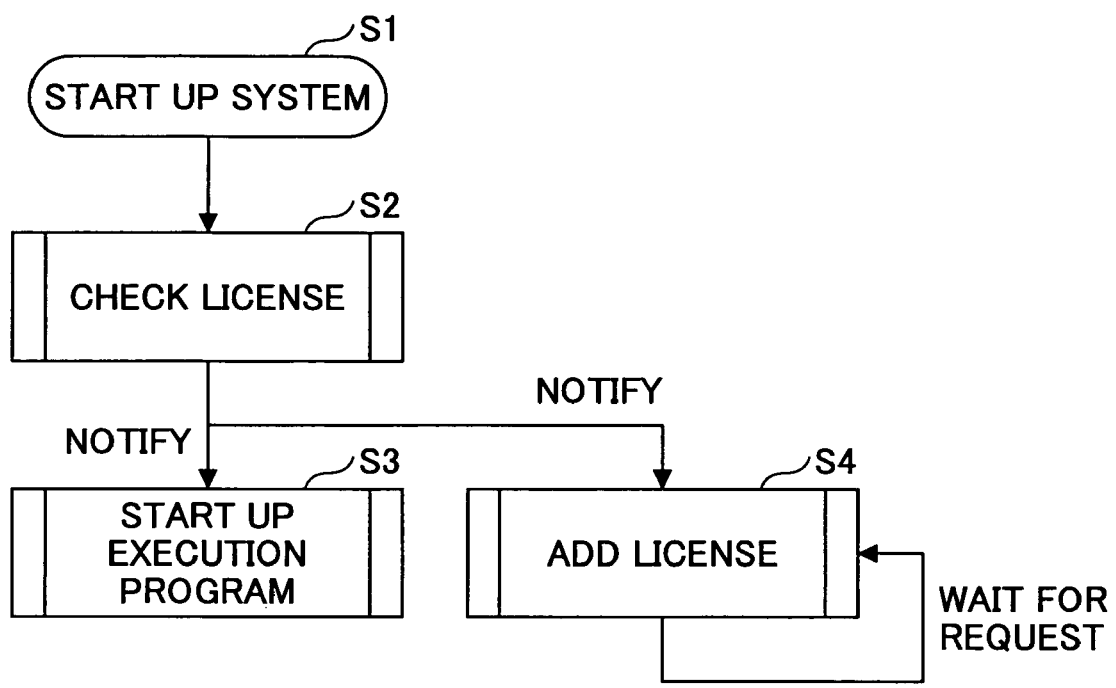
FIG. 4 shows a flow chart of a process calling procedure carried out from starting up of a system.

FIG. 4 shows a flow chart of a process calling procedure carried out upon starting up of the system, i.e., the information processing apparatus or the image forming apparatus.

When the system is started up (Step S1), the license checking part 224 checks the license information (Step S2). That is, the license information 212 of the removable information recording medium 201, inserted and loaded in the image forming apparatus, and the license information 222 of the non-volatile memory 204 are checked. Specifically, it is checked as to whether or not each of the license information 212 and the license information 222 includes identification information mutually identifying the other device. That is, identification information identifying the system of the image forming apparatus should be included in the license information 212 of the removable information recording medium 201. Similarly, identification information identifying the removable information recording medium 201 should be included in the license information 222 of the image forming apparatus.

When each of the license information includes identification information mutually identifying the other device, this determination results in "license registered (i.e., actual execution of the execution program 211 by the information processing apparatus 220 is allowed)". When either one of the license information does not include identification information identifying the other device, the determination results in "no license (license not registered)". When some error occurs during the determination process, this process results in "license error".

A relevant one of these determination results is then notified of to the program executing part 221, which then executes the execution program 211 from the removable information recording medium 201, when the determination result thus notified of indicates "license registered" (Step S3). On the other hand, when the determination result indicates "license not registered", the license adding part 223 also notified of this result carries out license information adding process after waiting for and then receiving a relevant license adding request from an operator (Step S4).

Figure 5:
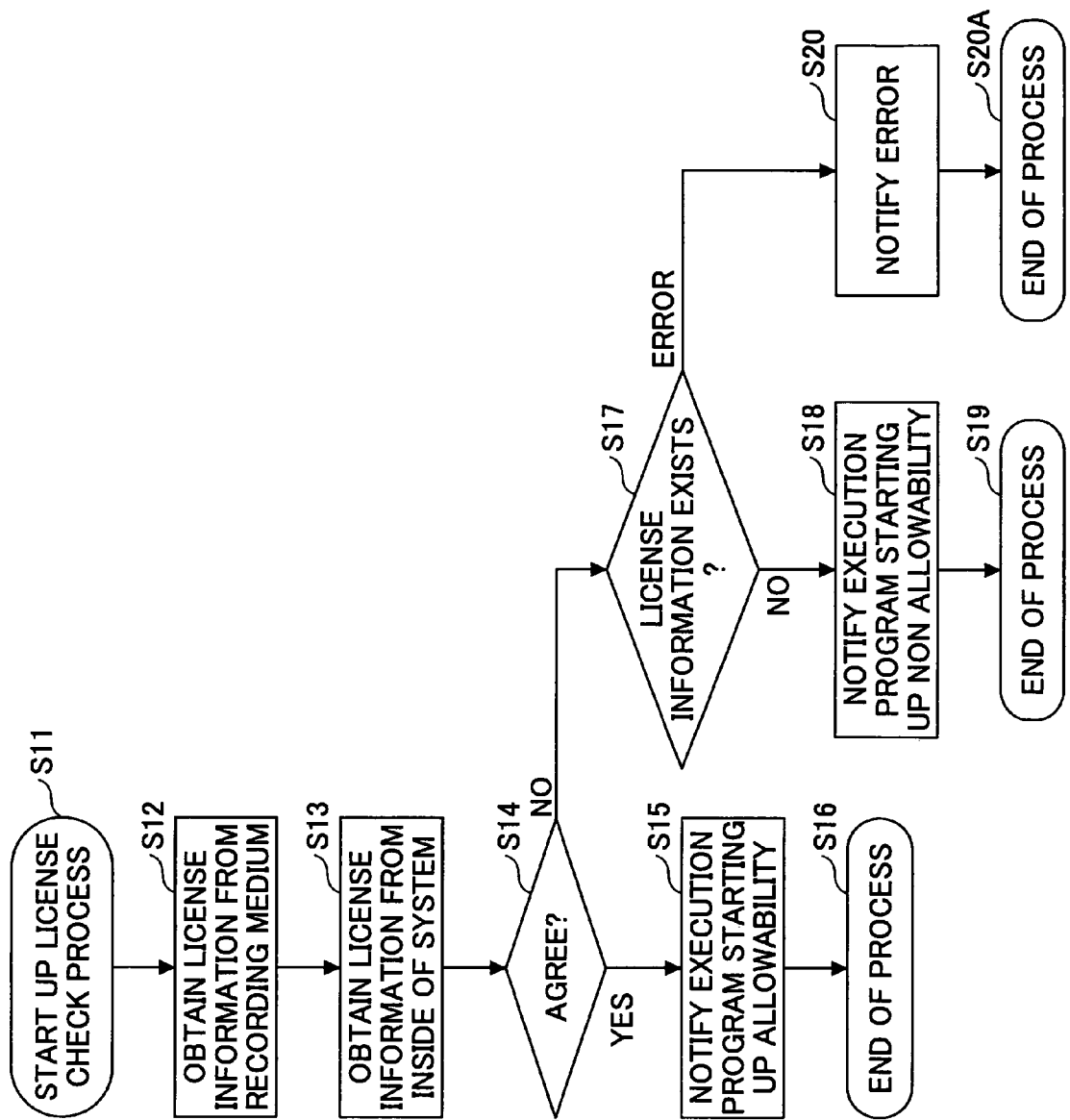
FIG. 5 shows a flow chart of a license checking process.

FIG. 5 shows a flow chart of the license checking process carried out by the license checking part 224 in Step S2 of FIG. 4.

When the license checking process is started (Step S11), the license checking part 224 obtains the license information 212 from the removable information recording medium 201 (Step S12). Also, the license checking part 224 obtains the license information 222 from the non-volatile memory 224 (Step S13). The license checking part 224 then checks the license information 212 and the license information 222 thus obtained in Step S12 and Step S13 (Step S14), respectively. Specifically, whether or not the license information 212 obtained from the removable information recording medium 201 includes the identifying information uniquely determining the system of the image forming apparatus is determined. Similarly, whether or not the license information 222 obtained from the non-volatile memory 204 includes the identification information uniquely determining the removable information recording medium 201 is determined.

When the respective ones of the license information include the identification information uniquely determining the other devices, i.e., the image forming apparatus and the removable information recording medium (Yes in Step S14), the license checking part 224 notifies the program executing part 211 and the license adding part 223 of the "license registered" state (Step S15). Then, the current process is finished (Step S16).

When either one of the license information does not agree with the identification information of the other device, i.e., the identification information of the image forming apparatus or the identification information of the removal information recording medium 201 (No in Step S14), the license checking part 224 then determines as to whether or not the relevant license information is registered at both devices (Step S17). When the license information 212 of the removable information recording medium 201 does not include the identification information of the image forming apparatus and also, the license information 222 of the non-volatile memory 204 does not include the identification information of the removable information recording medium 201 (No in Step S17), it is determined that registration between both devices has not been carried out. In other words, no license adding process has been carried out therebetween yet. In this case, the license checking part 224 notifies the program executing part 221 and the license adding part 223 of the "no license" state (Step S18), and the current process is finished (Step S19).

When the determination result of Step S17 is neither the "license registered" state nor the "no license" state (Error in Step S17), that is, only either one of the license information includes the identification information of the other device, a "license error" state results, this state is notified of to the operator (Step S20) from the operation part 202, and the current process is finished (Step S20A).

Figure 6:
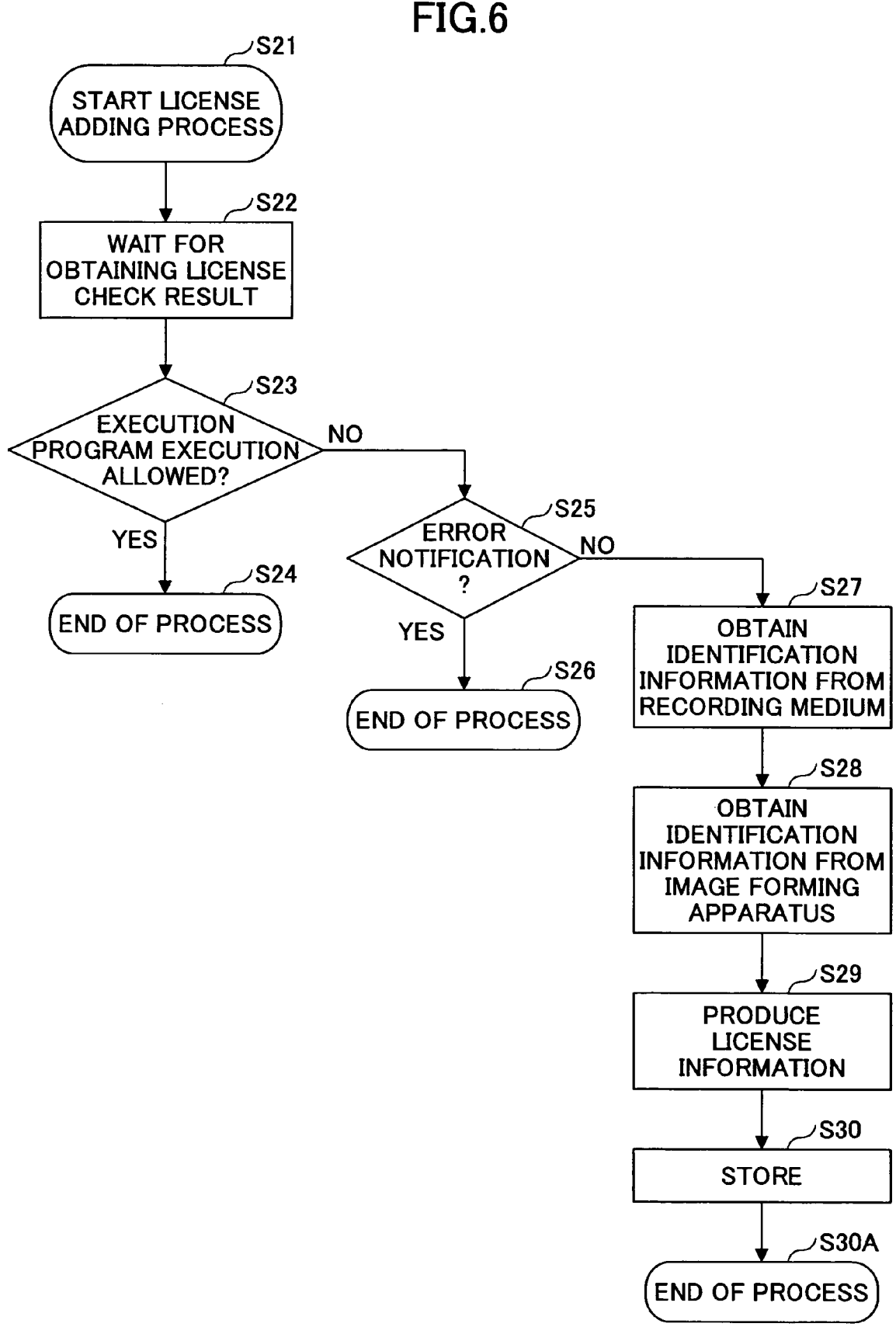
FIG. 6 shows a flow chart of a license adding process.

FIG. 6 shows a flow chart illustrating the license adding process carried out by the license adding part 223.

When the process is started (Step S21), the license adding part 223 waits for a notification of a state obtained from the above-mentioned license checking process (Step S22). Then, the license adding part 223 determines whether or not, the notified state from the license checking process is the "license registered" state, and thus, execution of the execution program 211 is allowed (Step S23). When the notified state is the "license registered" state, license adding should not be carried out, and, the current process is finished (Step S24).

On the other hand, when the result of the determination in Step S23 is other than the "license registered" state, the license adding part 223 determines whether or not the result indicates the "no license registered" state (Step S25). When the determination result indicates the "license error" state (Yes in Step S25), license adding is not carried out, and, the current process is finished (Step S26).

On the other hand, when the determination in Step S25 indicates the "no license" state (No in Step S25), license adding is to be carried out, and, the license adding part 223 carries out the corresponding process upon receiving a request from the operator. In the license adding process, the licensee adding part 223 obtains, from the removable information recording medium 201, the identification information uniquely determining the removable information recording medium 201 itself and the name of the execution program 211 which the removal information recording medium stores (Step S28). Then the license adding part 223 obtains the identification information uniquely determining the particular product of the image forming apparatus (Step S28).

The license adding part 223 thus obtains the respective ones of the identification information from both devices and the name of the target execution program 211 as the license information (Step S29). The license adding part 223 then stores, in the removable information recording medium 201 and the non-volatile memory 204 of the image forming apparatus, the license information including the identification information mutually identifying the other devices, respectively (Step S30), and the current process is finished (Step S30A).

Figure 7:
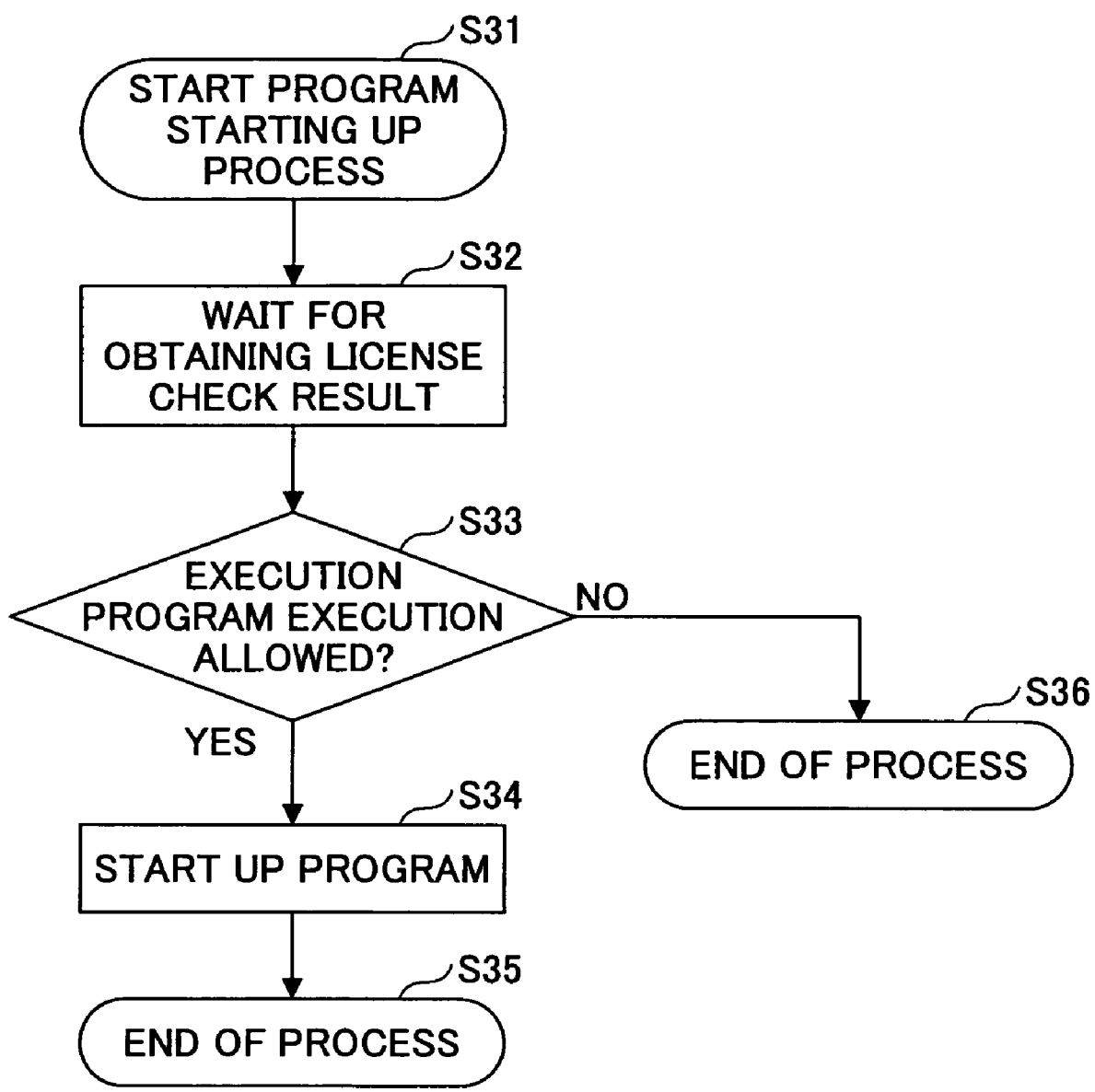
FIG. 7 shows a flow chart of a program executing process.

FIG. 7 shows a flow chart of a program executing process carried out by the program executing part 221.

When the process is started in Step S31, the program executing part 221 waits for a notification of a state obtained when the above-mentioned license checking process is finished (Step S32). Then, the program executing part 221 determines whether or not the notified result indicates the "license registered" state (Step S33). When the determination result in Step S33 is the "license registered" state, the program executing part 221 starts up the execution program 211 from the removable information recording medium 201 (Step S34), and finishes the current process (Step S35). When the determination result in Step S33 is not the "license registered" state, the program executing part 221 does not execute the execution program 211 from the removable information recording medium, and finishes the current process (Step S36).

Next, another embodiment of the present invention will be described.

Figure 8:
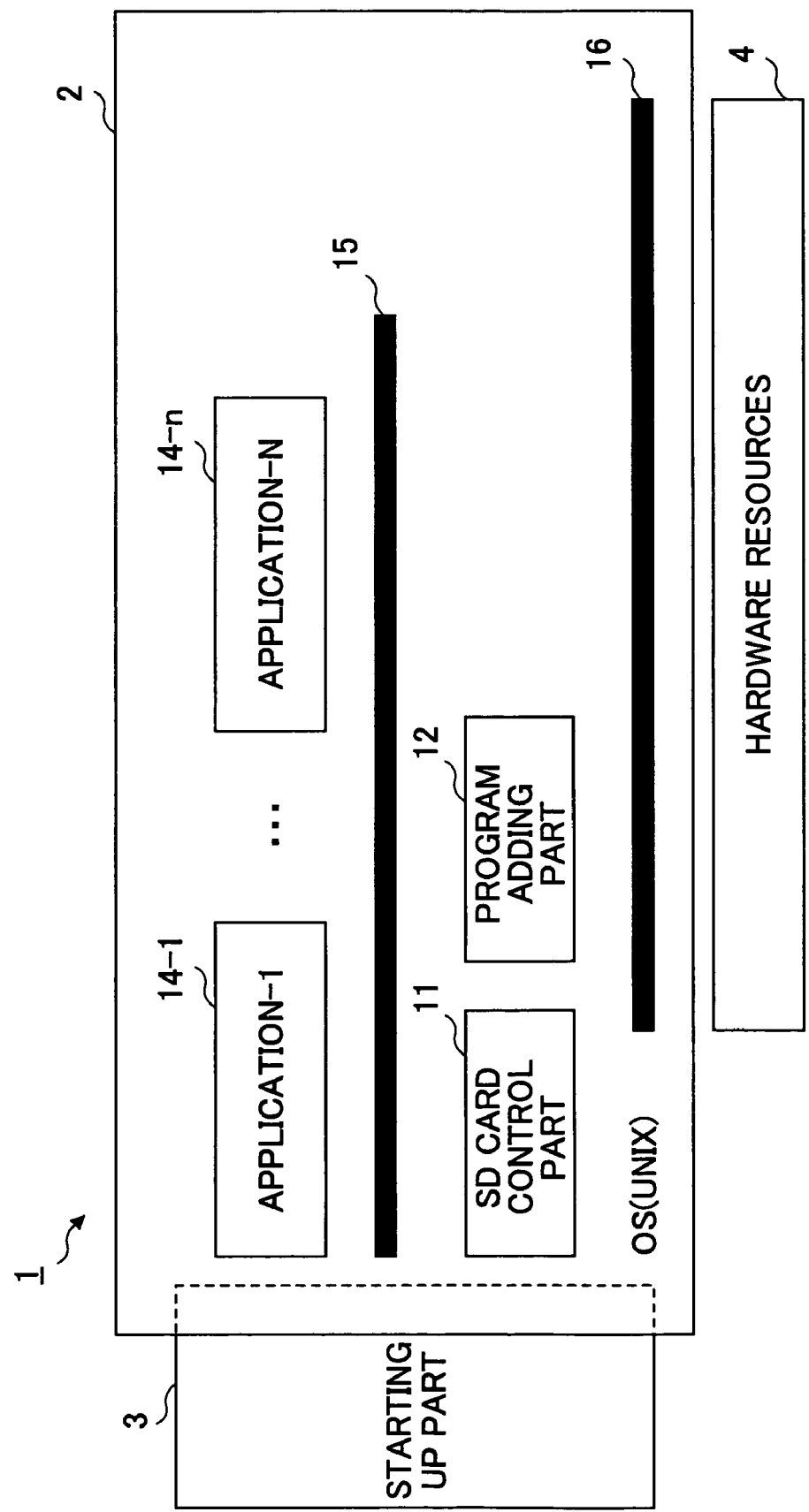
FIG. 8 shows a configuration of one embodiment of an information processing apparatus according to the present invention.

FIG. 8 is a block diagram of an embodiment of an information processing apparatus of the present invention. The information processing apparatus 1 is configured so that a software group 2, a stating up part 3, and hardware resources 4 may be included. The starting up part 3 is first activated upon turning on of the information processing apparatus 1, and starts a program starting up part which is described later. The program starting up part starts the software group 2 of the information processing apparatus 1. Moreover, the program starting up part reads programs of a SD card control part 11, a program adding part 12, applications 14-1 to 14-n from an auxiliary memory device or a SD card, etc., and transmits each program to a memory device so that it starts the program. Hereinafter, the applications mean application programs which are executed on an OS (operating system), and such programs or the application programs may also be called the applications.

Hardware resources 4 include an input device, a display device, the auxiliary memory device, a memory device, an interface device, and a SD-card slot. Moreover, the software group 2 includes programs of the SD card control part 11, the program adding part 12, and the applications 14-1 to 14-n, which are started on the OS, such as UNIX (registered trademark). The OS carries out parallel execution of the programs (or the applications) of the SD card control part 11, the program adding part 12 and the applications 14-1 to 14-n, as the processes on the OS.

An API (application program interface) 15 is used for a pre-defined function to receive a request from the applications 14-1 to 14-n. An engine I/F 16 is used for the pre-defined function to transmit the request to the hardware resources 4. It is noted that the SD card control part 11 obtains a state of an SD card when it is inserted in the SD card slot, and shows this state to an operator via an SCS, as will be described later. The program adding part 12 carries out authentication of an application adding file stored in an application starting up SD card, which will also be described later.

Figure 9:
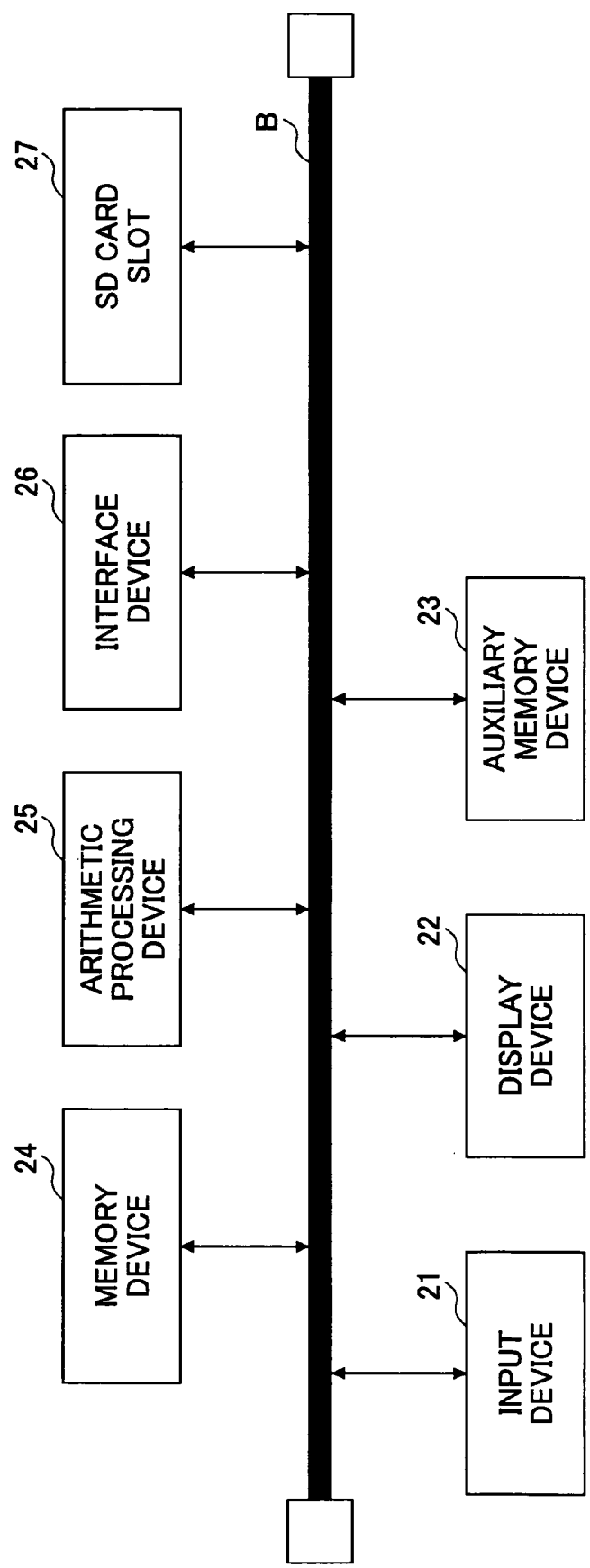
FIG. 9 shows a hardware configuration diagram of the embodiment of the information processing apparatus according to the present invention.

Next, a description will be given of a hardware composition of the information processing apparatus 1 of FIG. 8. FIG. 9 shows a hardware composition of the information processing apparatus 1 of the present invention. The information processing apparatus 1 of FIG. 9 is configured so that the input device 21, the display device 22, the auxiliary memory device 23, the memory device 24, the arithmetic processing device 25, the interface device 26, and the SD card slot 27, which are interconnected by a bus B, may be included.

The input device 21 includes a keyboard, a mouse, etc., and it is used by an operator to input various operational instructions. The display device 22 displays various operational data and pages which are required for operations. The interface device 26 provides interfaces for connecting the information processing apparatus 1 to a communication network or a computer terminal, and includes a modem, a router, or a device according to various interface specifications.

Insertion and removal of an SD card is possible from/to the SD card slot 27. An interrupt signal, which is generated in response to the insertion or removal of the SD card, is transmitted to the SD card control part from the SD card slot 27. The auxiliary memory device 23 stores various files, data, etc. The SD card inserted in the SD card slot 27 and the auxiliary memory device 23 store the programs of the SD card control part 11, the program adding part 12, the applications 14-1 to 14-n, which are related to processing of the information processing apparatus 1, and store various files, data, etc. required for the program processing.

The memory device 24 stores the programs, which are read from the SD card control part 11, the program adding part 12, and the applications 14-1 to 14-n, from the SD card inserted in the SD card slot 27, and the auxiliary memory device 23, etc. at the time of starting up of the information processing apparatus 1. The arithmetic processing unit 25 performs arithmetic processing according to the programs of the SD card control part 11, the program adding part 12 and the applications 14-1 to 14-n, which are stored in the memory device 24.

Next, a description will be given of a configuration of a multifunction machine 31 as an application example of the information processing apparatus 1 of the invention. The following description will be focused on the configuration of the multifunction machine 31. However, the same is applicable to a configuration of the information processing apparatus 1 of the invention.

An image forming apparatus in the present embodiment is provided with respective functions of image forming modules, such as a printer, a copier, a facsimile, and a scanner, which are contained in one housing of the apparatus, and the image forming apparatus will be called the multifunction machine.

The multifunction machine includes a display unit, a printing unit, an image reading unit, etc. in a single housing, and is provided with four kinds of software (application programs) corresponding to a printer, a copier, a facsimile, and a scanner, respectively. By selecting one of these applications, and the multifunction machine is operated as the selected one of the printer, the copier, the facsimile, and the scanner.

Figure 10:
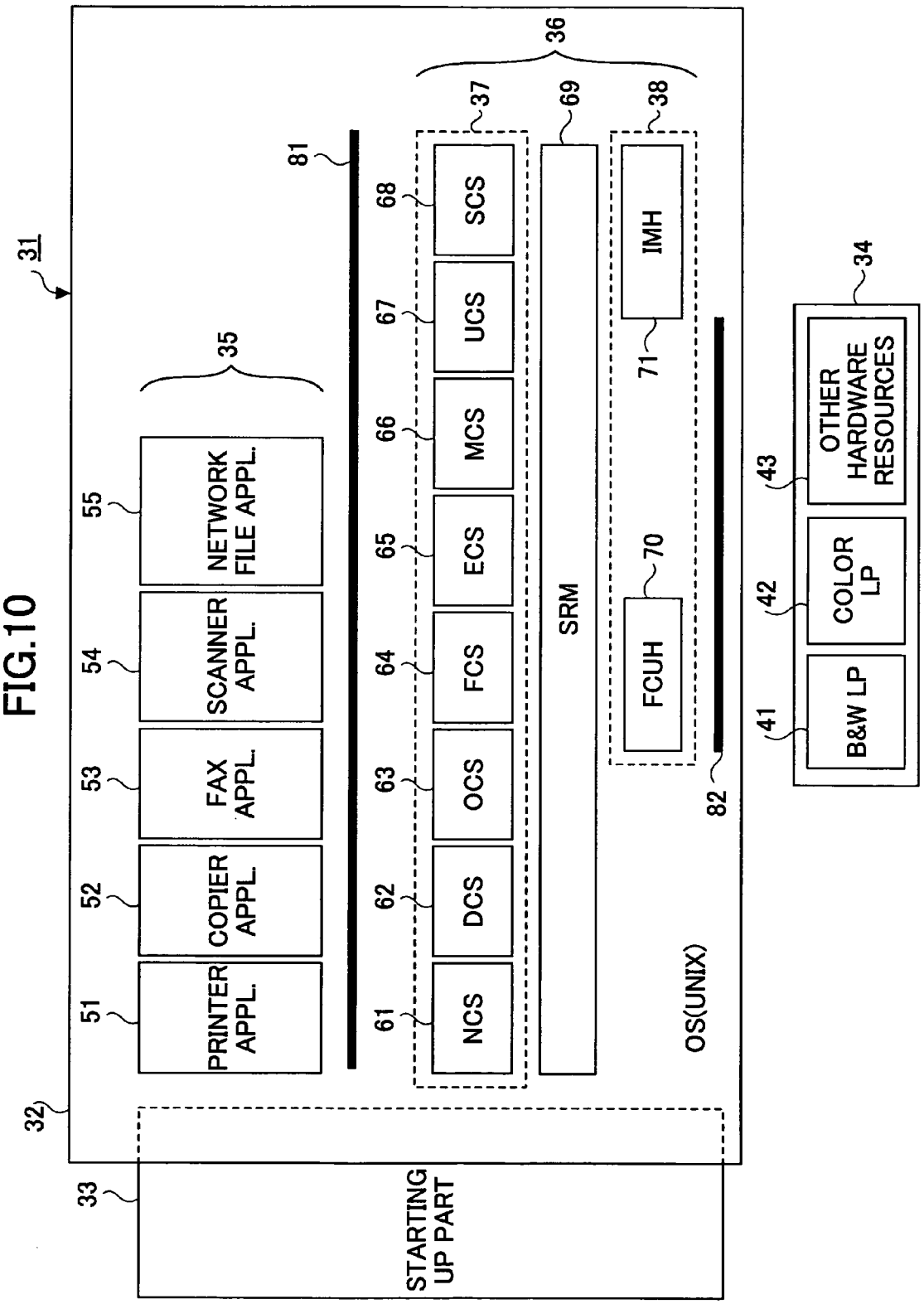
FIG. 10 shows a configuration diagram of a multifunction machine according to the present invention.

FIG. 10 is a block diagram of an embodiment of the multifunction machine of the invention. As shown in FIG. 10, the multifunction machine 31 is configured so that a software group 32, a multifunction machine starting up part 33, and hardware resources 34 are included. The multifunction machine starting up part 33 is activated upon power turning on of the multifunction machine 31, and starts execution of an application layer 35 and a platform 36 in the software group 32. For example, the multifunction machine starting up part 33 reads programs of the application layer 35 and the platform 36 from a hard disk drive (HDD) etc., transfers each read program to the memory storage, and starts the execution thereof. The hardware resources 34 include a monochrome laser beam printer (B&W LP) 41, a color laser printer (Color LP) 42, and other hardware resources 43, such as a scanner and a facsimile. The software group 32 includes the application layer 35 and the platform 36 which are operated on the operating system (OS), such as UNIX (registered trademark).

The application layer 35 includes programs which perform processing specific to respective user services related to image formation, such as the printer, the copier, the facsimile, and the scanner. Specifically, the application layer 35 includes a printer application 51, a copier application 52, a fax application 53, a scanner application 54, and a network file application 55. The platform 36 includes a control service layer 37, a system resource manager (SRM) 69, and a handler layer 38. The control service layer 37 interprets a processing request from the application layer 35, and generates an acquisition request to the hardware resources 34. The SRM 69 manages one or more hardware resources 34, and arbitrates the acquisition requests from the control service layer 37. The handler layer 38 manages the hardware resources 34 according to the acquisition requests from the SRM 69.

The control service layer 37 is configured to include one or more service modules therein. Specifically, the control service layer 37 includes a network control service (NCS) 61, a delivery control service (DCS) 62, an operation panel control service (OCS) 63, a facsimile control service (FCS) 64, an engine control service (ECS) 65, a memory control service (MCS) 66, a user information control service (UCS) 67, and a system control service (SCS) 68.

In addition, the platform 36 is configured with pre-defined functions so that an application program interface (API) 81 which receives a processing request from the application layer 35 is included. The operating system (OS) carries out parallel execution of the applications of the application layer 35 and the platform 36 as processes thereon.

The process of the NCS 61 acts as an agent that distributes data received from the communication network through a corresponding protocol over the applications, and transmits the data from the applications to the communication network through the corresponding protocol. The process of the DCS 62 controls delivery of accumulated documents etc. The process of the OCS 63 controls operation of an operation panel. The process of the FCS 64 provides an application program interface for performing facsimile transmission and reception. The process of the ECS 65 controls the engine units, such as the monochrome laser beam printer 41, the color laser printer 42, and the other hardware resources 43. The process of the MCS 66 performs memory control of the memory acquisition and releasing, a use of HDD, compression and expansion of image data, etc. The process of the UCS 67 manages user information. The process of the SCS 68 controls application management, operation panel control, system monitor displaying, LED monitor displaying, hardware-resources management, interrupted application control, etc. The process of the SRM 69 carries out the system control and the management of the hardware resources 34 associated with the SCS 68.

The handler layer 38 includes a facsimile control unit handler (FCUH) 70 which manages a facsimile control unit (FCU), and an image memory handler (IMH) 71 which carries out memory assignment of a process and management of a memory assigned to the process. The SRM 69, the FCUH 70, and the IMH 71 perform processing request to the hardware resources 34 by using an engine interface 82 which transmits a processing request to the hardware resources 34 with pre-defined functions. With the above-described configuration of FIG. 10, the multifunction machine 31 can carry out intensive control of each processing commonly required by the respective applications on the platform 36.

Figure 11:
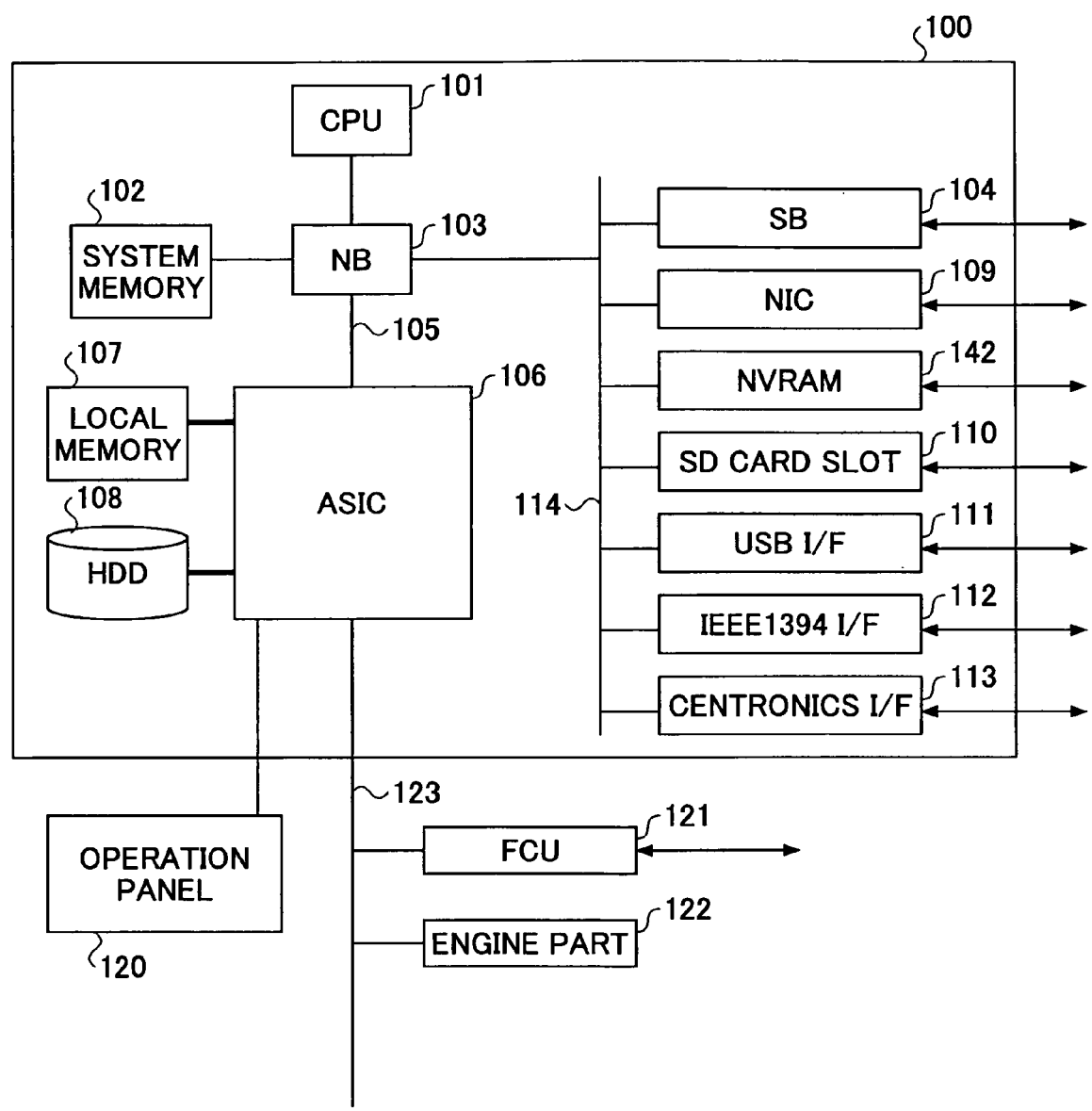
FIG. 11 shows a hardware configuration diagram of the multifunction machine according to the present invention.

Next, a description will be given of a hardware configuration of the multifunction machine 31 of the invention. FIG. 11 shows a hardware configuration of the multifunction machine 31 of FIG. 10. As shown in FIG. 11, the multifunction machine 31 includes a controller 100, an operation panel 120, a facsimile control unit (FCU) 121, and an engine part 122. The controller 100 includes a CPU 101, a system memory 102, a north bridge (NB) 103, a south bridge (SB) 104, a application-specific integrated circuit (ASIC) 106, a local memory (LM) 107, a hard disk drive (HDD) 108, a network interface controller (NIC) 109, an NVRAM 142, the SD card slot 110, an USB device 111, an IEEE1394 device 112, and a Centronics interface 113.

The CPU 101 performs control of the whole multifunction machine 31. The CPU 101 starts execution of the NCS 61, the DCS 62, the OCS 63, the FCS 64, the ECS 65, the MCS 66, the UCS 67, the SCS 68, the SRM 69, the FCUH 70, and the IMH 71, and performs each process of the programs on the OS. Moreover, the CPU 101 starts execution of the printer application 51, the copier application 52, the facsimile application 53, the scanner application 54, and the network file application, which constitute the application layer 35, and performs each process of the programs on the OS.

The NB 103 is a bridge which is provided for interconnection of the CPU 101, the system memory 102, the SB 104, and the ASIC 106. The system memory 102 is a memory which is used for image drawing of the multifunction machine 31. The SB 104 is a bridge which is provided for interconnection of the NB 103, the ROM (not shown), the PCI bus 114, and the peripheral devices. The local memory 107 is a memory which is used as an image buffer for copying documents or a buffer for encoding images.

The ASIC 106 is the application-specific integrated circuit for image processing uses including the hardware for image processing. The HDD 108 is a storage device for accumulating images, document data, programs, font data, forms, etc. The operation panel 120 is provided to display operational messages to an operator and receive input operational instructions from the operator. The NIC 109 is an interface device for connecting the multifunction machine 31 to the communication network.

The SD card slot 110 is provided to allow insertion and removable of an SD card, and the SC card slot 110 transmits an interrupt signal, generated in response to the insertion and removable of the SD card, to the SD card control part 11. The USB device 111, the IEEE1394 device 112 and the Centronics interface 113 are interface devices according to respective interface specifications.

The NVRAM 142 is a non-volatile memory, in which, a machine number, which is a product number of the multifunction machine 31 is previously written. Further, for the purpose of controlling usage of an application stating up SD card described later, identification information uniquely indicating the SD card is written through a unique combination setting process described later.

The FCU 121 has a memory, and is used for temporarily storing facsimile data upon power supply is turned off in the multifunction machine 31, for example.

Figure 12:
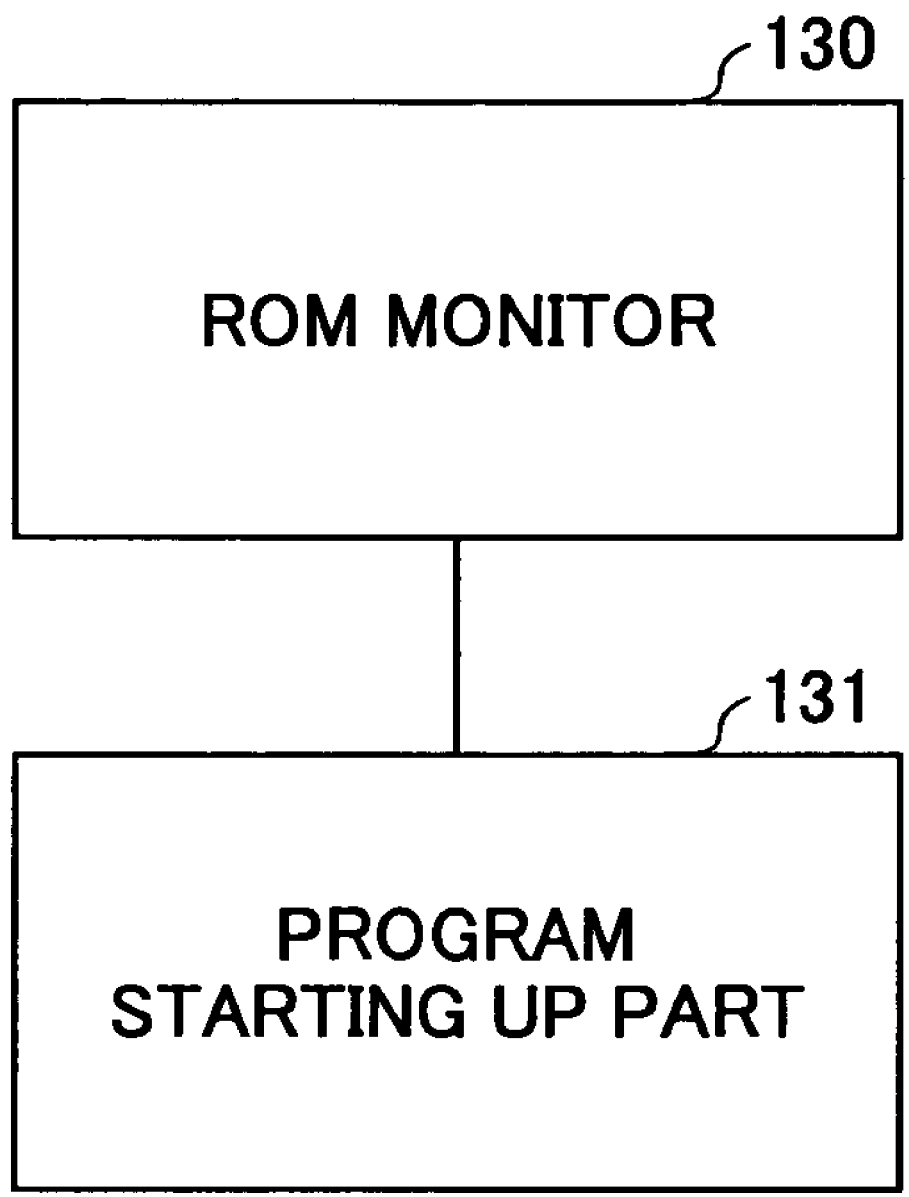
FIG. 12 shows a configuration diagram of one example of a multifunction machine starting up part.

The multifunction machine stating up part 33 shown in FIG. 10 is executed first when power supply in the multifunction machine 31 is turned on, and starts up the application layer 35 and the plate form 36. FIG. 12 is a block diagram of an example of the multifunction machine starting up part 33. The multifunction machine starting up part 33 includes a ROM monitor 130 and a program starting up part 131.

The ROM monitor 130 which is a BIOS and a boot loader is activated upon power turning on of the multifunction machine 31, and performs initialization of the hardware, diagnosis of the controller 100, initialization of the software, etc. The ROM monitor 130 expands the OS and the root file system on the system memory 102, and starts execution of the OS. The OS mounts the root file system.

Moreover, the program starting up part 131 is called from the OS, and secures memory areas on the system memory 102 and the LM 107. The program starting up part 131 is a process which is first initiated by the multifunction machine 31, and mounts a file system according to a predetermined configuration file. Specifically, according to the predetermined configuration file, the program starting up part 131 reads the programs of the application layer 35 and the platform 36, required for operation of the multifunction machine 31, from the HDD 108, the SD card, the ROM, etc., and expands each read program to the memory areas which are secured on the system memory 102 and the LM 107, so that the program starting up part 131 starts the processes of the application layer 35 and the platform 36.

Next, a description will be given of processing of the program starting up part 131. The program starting up part 131 reads a predetermined master configuration file at the time of starting, and performs mounting of the file system and starting of the processes according to the read master configuration file. Moreover, the program starting up part 131 performs mounting processing according to a description of the mounting, when the description of the mounting is included in the read master configuration file.

Furthermore, when a predetermined directory which includes a file of a predetermined extension in a root director of the a system mounted when a predetermined configuration file existed in a root of the mounted file system exists, the program starting up part 131 reads the predetermined configuration file or the file of the predetermined extension, and performs mounting processing of the file system.

In addition, "gzromfs" is an example of the file system which can be mounted by the program starting up part 131. This file system "gzromfs" manages files of ROMFS format which are "gzip" compression encoded.

Next, license checking operation, which is operation carried out in the multifunction machine 31, will be described.

The license checking operation is executed when an execution program is to be executed from an application starting up SD card. The execution program corresponds to predetermined substance information previously stored in the application starting up SD card, used as a program starting up information recording medium, as described later.

Thanks to the application starting up SD card, a new function may be freely added to the multifunction machine 31, in a form of the execution program. The execution program can be executed from the application starting up SD card as a new application program of the application layer 35 of the multifunction machine 31, after the license checking operation is passed through. As a result, the function provided by the execution program is actually added as a new function of the multifunction machine 31.

Figure 13:
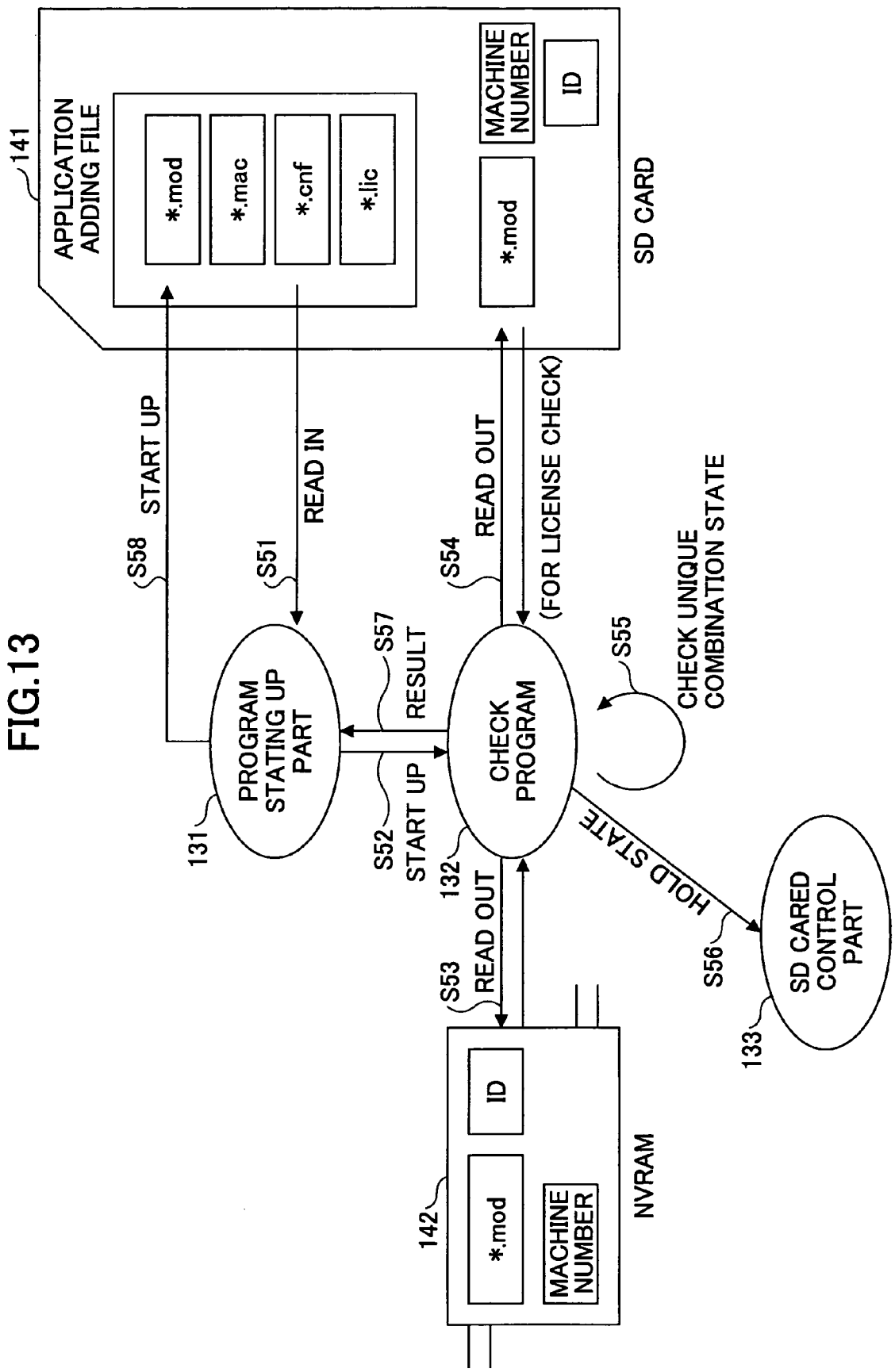
FIGS. 13, 14 and 15 show flows of state checking operation carried out upon starting up of the multifunction machine of FIG. 10.

As shown in FIG. 13, in the application starting up SD card 141, an 'application adding file' in which a 'request application' file (*.mod) as the execution program, an electronic signature file (*.mac) for authentication of the 'request application' file, a setting file (*.cnf) in which predetermined setting information is written concerning the 'request application', and an electronic signature (*.lic) for authentication of the setting file are written, is stored.

The application starting up SD card 141 may be produced as a result of the application adding file being stored in an SD card. For example, the United States Patent Publication No. US 2004/0187008 A1 describes a process for producing such an application starting up SD card 141 with reference to FIGS. 6 through 17 of this publication document. It is noted that, in this publication document, the application adding file is called a 'program-addition file'.

The program stating up part 131 shown in FIG. 13 corresponds to the program starting up part 131 described above with reference to FIG. 12. A check program 132 is included in the application layer 35 shown in FIG. 10 (but the check program 132 itself is not shown in FIG. 10). The check program 132 is configured to determine whether or not a usage of the application starting up SD card 141 inserted in the SD card slot 110 of the multifunction machine 31, described above with reference to FIG. 11, is allowed.

An SD card control part 133 shown in FIG. 13 corresponding to the SD card control part 11 shown in FIG. 8 is included, for example, in the multifunction machine stating up part 33 together with the above-mentioned program starting up part 131, and is configured to obtain a state of the application starting up SD card 141 inserted in the SD card slot 110.

The NVRAM 142 corresponds to the NVRAM 142 described above with reference to FIG. 11.

In FIG. 13, when the application starting up SD card 141 (corresponding to the 'program addition SD card' discussed in the above-mentioned US patent publication document) is inserted in the SD card slot 110 of the fusion machine 31, the program starting up part 131 reads the application adding file from the application starting up SD card 141 (Step S51). Then, the program starting up part 131 starts up the check program 132 (Step S52).

The check program 132 thus started up, then reads out, from the NVRAM 142, the name '*.mod' of the above-mentioned 'request application' file (corresponding to the execution program stored in the application starting up SD card 141) and identification information ID uniquely indicating the application starting up SD card 141 itself (Step S53). It is noted that, as described later, the information thus read out is previously written in the NVRAM 142 through a unique combination setting process.

Next, the check program 132 reads out the name '*.mod' of the 'request application' file and the machine number of the multifunction machine from the application starting up SD card 141 inserted in the SD card slot 110 (Step S54). It is noted that, as described below, the information thus read out is previously written in the application starting up SD card 141 through the unique combination setting process.

That is, through the unique combination setting process, described later in detail with reference to FIGS. 16 through 18, the name '*.mod' (module name) of the execution program included in the application adding file and the identification information ID uniquely indicating the application starting up SD card 141 itself are previously written in the NVRAM 142 of the multifunction machine 31 concerning the above-mentioned unique combination. Similarly the machine number uniquely indicating the multifunction machine 31 and the name '*.mod' of the execution program of the above-mentioned application adding file are written in the application starting up SD card 141 concerning the corresponding unique combination.

Figure 18:
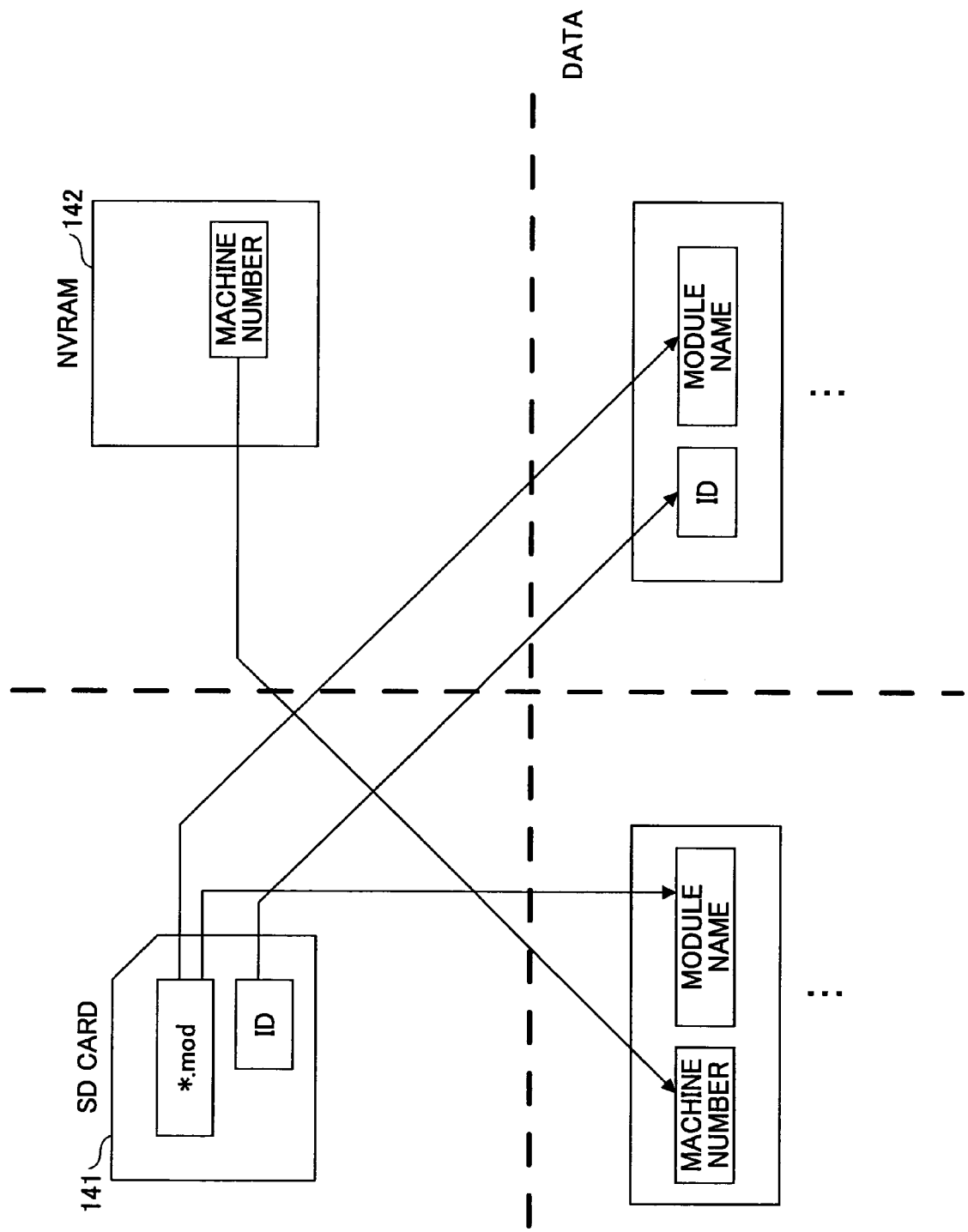
FIG. 18 illustrates data exchange of license information and a data structure of the same in the multifunction machine of FIG. 10.

That is, in the unique combination setting process, license information is exchanged between the devices concerning the unique combination, i.e., between the multifunction machine 31 and the application stating up SD card 141, as shown in FIG. 18. As a result, as will be described below, the license checking operation results in success, and thus, a usage of the application adding file from the application starting up SD card 141 concerning the unique combination by the multifunction machine 31 concerning the same unique combination is allowed.

Returning to the description of FIG. 13, the check program 132 determines, based on the information thus obtained in Steps S53 and S54, whether or not a 'unique combination' state has been set between the multifunction machine 31 and the application starting up SD card 141 inserted in the SD card slot 110 of the multifunction machine 31 (Step S55).

That is, the check program 132 determines in Step S55, whether or not the execution program's name, the identification information ID of the application starting up SD card 141 and the machine number of the multifunction machine 31 itself, read from the NVRAM 142, in Step 53, completely agree with the execution program's name, the identification information ID of the application starting up SD card 141 itself and the machine number of the multifunction machine 31, read from the SD card 141 inserted in the SD card slot 110 of the multifunction machine 31, in Step 54, respectively.

It is noted that, in the unique combination setting process, the license information is mutually exchanged as shown in FIG. 18. As a result, on the side of the application starting up SD card 141, as the license information, the machine member of the multifunction machine 31 and the module name '*.mod' are stored. As a result, in the application starting up SD card 141, the license information may include total three types of information, i.e., the machine number of the multifunction machine 31 as the counterpart; the module name of the target execution program; and the identification information ID of the application setting up SD card 141 itself.

Similarly, on the side of the multifunction machine 31, through the license information exchange process in the unique combination setting process, in the NVRAM 142 of the multifunction machine 31, the license information may include the one-to-one corresponding total three types of information, i.e., the machine number of the multifunction machine 31 itself; the module name of the target execution program; and the identification information ID of the application setting up SD card 141 as the counterpart.

In the determination in Step S55 of comparing the license information, it is preferable in a viewpoint of security, to apply all of these three types of license information, and complete agreement thereof is required. However, these three types of license information should not necessarily be applied. A configuration may be provided also according to the present invention in which agreement of merely at least one of these three type of the license information is required.

When the license information read out from the NVRAM 142 agrees with the license information read out from the application starting up SD card 141 inserted in the SD card slot 110, the check program 132 determines that the 'unique combination' state is verified between the multifunction machine 31 and the application starting up SD card 141 inserted in the SD card slot 110 of the multifunction machine 31.

When the unique combination state is thus verified, the check program 132 notifies the SD card control part 133 of this matter (Step S56).

Also, the check program 132 notifies the program starting up part 131 of this matter (Step S57). The program stating up part 131 receiving this notification then actually starts up the application adding file from the application stating up SD card 141 (Step S58).

As a result, based on the 'required application' file *.mod, which is the execution program body of the application adding file, the electronic signature *.mac thereof, the setting file *.cnf and the electronic signature *.lic thereof, actual execution of the execution program, i.e., the 'required application' file, is allowed. As a result, a new function provided by this program is actually added to the multifunction machine 31.

It is noted that, the above-mentioned program adding part 12 (see FIG. 8) caries out an authentication process by using the electronic signature file *.mac of the above-mentioned 'required application' file and the electronic signature *.lic of the setting file. Thus, authentication of these 'required application' file and the setting file is carried out. As a result, the contents of these files are verified as not have been tampered, for example. A specific process of the authentication is, for example, shown by the above-mentioned US patent publication document, FIGS. 11 and 12, and associated description.

Figure 14:
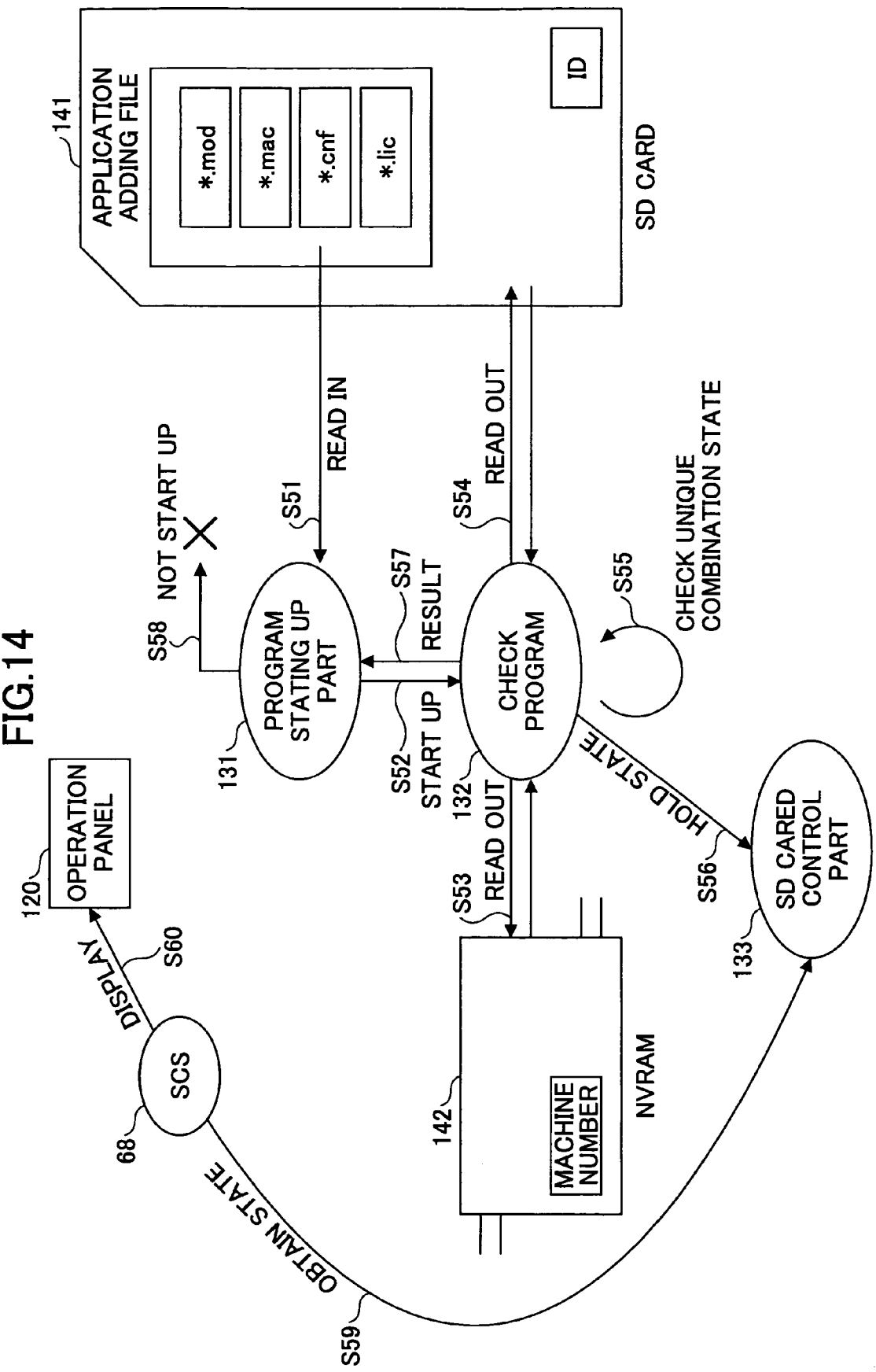

FIG. 14 corresponds to FIG. 13. However, in this case, different from the case of FIG. 13, the above-mentioned unique combination setting process has not been carried out in particular between the multifunction machine 31 and the application starting up SD card 141 inserted in the SD card slot 110 of the multifunction machine 31.

In such a case, in the NVRAM 142 of the multifunction machine 31, the corresponding license information including the name (module name) of the execution program stored in the application starting up SD card 141 and the identification number ID of the application starting up SD card 141 itself is not written. Similarly, in the application stating up SD card 141, the corresponding license information including the name of the execution program and the machine number of the multifunction machine 31 is not written.

In this case, the operation of Steps S51 through S54 is carried out the same as in the case of FIG. 13. After that, the check program 132 checks in Step S55 the information read out from the NVRAM 142 of the multifunction machine 31 in Strep S53 and the information read out from the application adding SD cared 141 inserted in the SD card slot of the multifunction machine 31 in Step S54. Thus, the check program 132 determines whether or not the unique combination state has been already set between the multifunction machine 31 and the application adding SD card 141.

As mentioned above, in the NVRAM 142 of the multifunction machine 31, the corresponding license information including the name (module name) of the execution program which is stored in the application starting up SD card 141 and the identification number ID of the application starting up SD card 141 itself is not written in this case. Similarly, in the application stating up SD card 141, the corresponding license information including the name of the execution program and the machine number of this multifunction machine 31 is not written. As a result, no agreement is obtained from any one of the above-mentioned three types of license information. Accordingly, the check program 132 determines that the unique combination state has not been set.

This determination result is notified of to the SD card control part 133 from the check program 132 (Step S56), and also, is notified of to the program starting up part 131 (Step S57).

As a result, the program stating up part 131 receiving this notification does not start up the execution program 'required application' file *.mod from the application adding file stored in the application starting up SD card 141, in Step S58.

It is noted that the SCS 68 of the multifunction machine 31 described above with reference to FIG. 10 obtains the same determination result from the check program 132 via the SD card control part 133, and notifies an operator of this matter by displaying the contents on the operation panel 120, in Step S59.

Thus, according to the embodiment of the present invention, between the multifunction machine 31 and the application starting up SD card 141, between which the unique combination state has not been set, the function provided by the execution program cannot be actually added to the multifunction machine 31 even when the application starting up SD card 141 storing the execution program is inserted in the multifunction machine 31. As a result, the function provided by the execution program included in the application adding file stored in the application starting up SD card 141 can be positively prevented from illegally added to the multifunction machine 31 for which the unique combination state has not been set.

Figure 15:
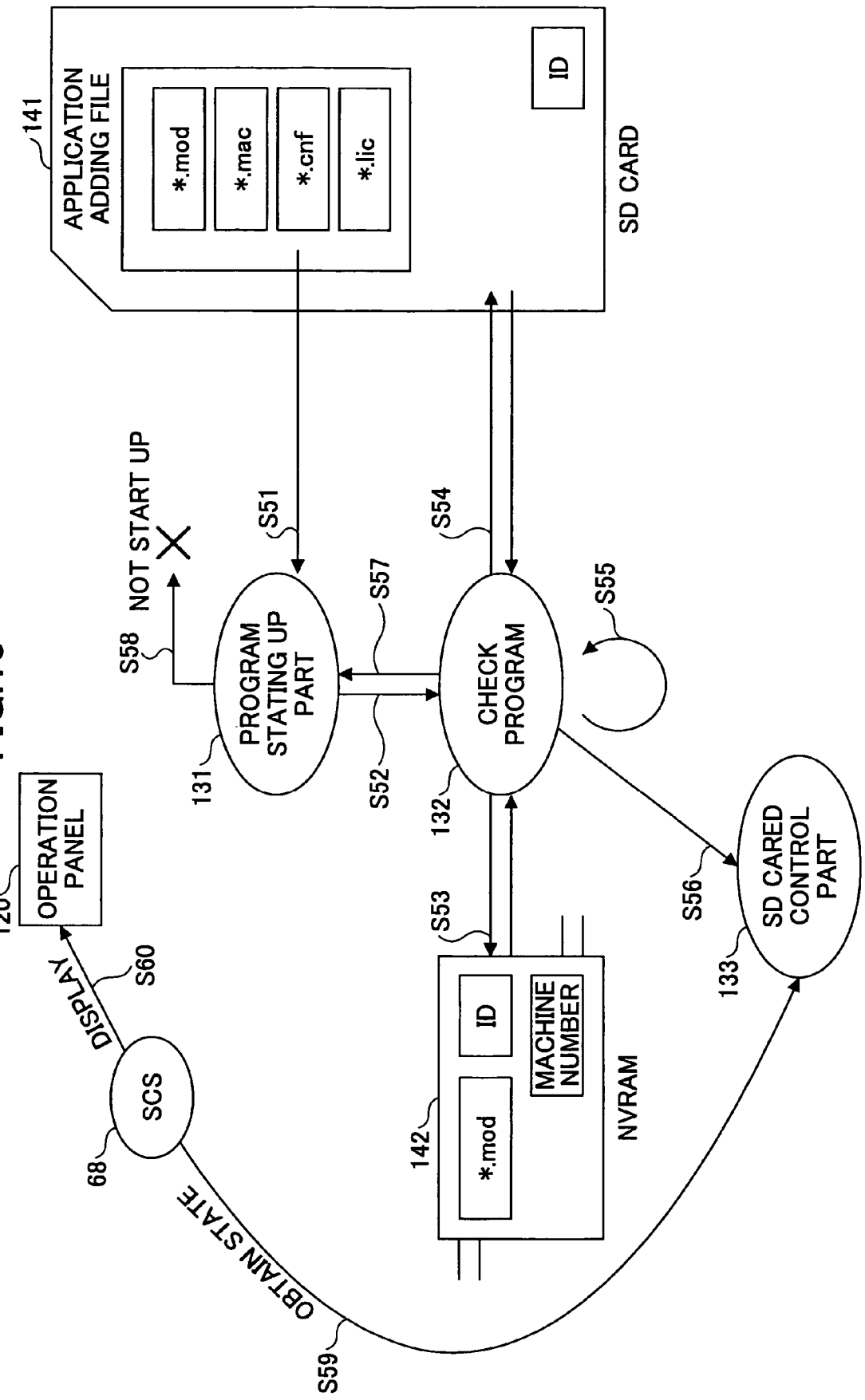

FIG. 15 corresponds to FIG. 14. However, different from the case of FIG. 14, the unique combination state has been already set between the multifunction machine 31 and one application starting up SD card 141. However, an application starting up SD card 141 currently inserted in the multifunction machine 31 is one different from the application starting up SD card with which the unique combination state has been set as mentioned above.

That is, in this case, the application stating up SD card 141 currently inserted and thus loaded in the multifunction machine 31 has not undergone the unique combination setting process with this multifunction machine 31. As a result, in this application stating up SD card 141, the corresponding license information including the machine number of this multifunction machine 31 is not stored.

In this case, in the determination of Step S55 for verifying the unique combination state, agreement of the above-mentioned three types of license information cannot be obtained accordingly. As a result, the license check program 132 determines that no verification of the unique combination state is obtained. That is, in this case, the identification information ID of the above-mentioned one application starting up SD card 141 is written in the NVRAM 142 of the multifunction machine 31 as mentioned above. However, the identification number ID of the application starting up SD card written there is different from the identification number ID of the application starting up SD card 141 currently loaded in the multifunction machine 31. As a result, agreement is not obtained at least for the identification number ID of the application starting up SD card 141 of the above-mentioned three types of license information.

Thus, the check program 132 determines that the unique combination state has not been set the same as in the case of FIG. 14. This determination result is then notified of to the SD card control part 133 from the check program 132 (Step S56), and also, is notified of to the program starting up part 131 (Step S57).

As a result, the program stating up part 131 receiving this notification does not start up the execution program 'required application' file *.mod from the application adding file stored in the application starting up SD card 141, in Step S58 the same as in the case of FIG. 14.

Figure 16:
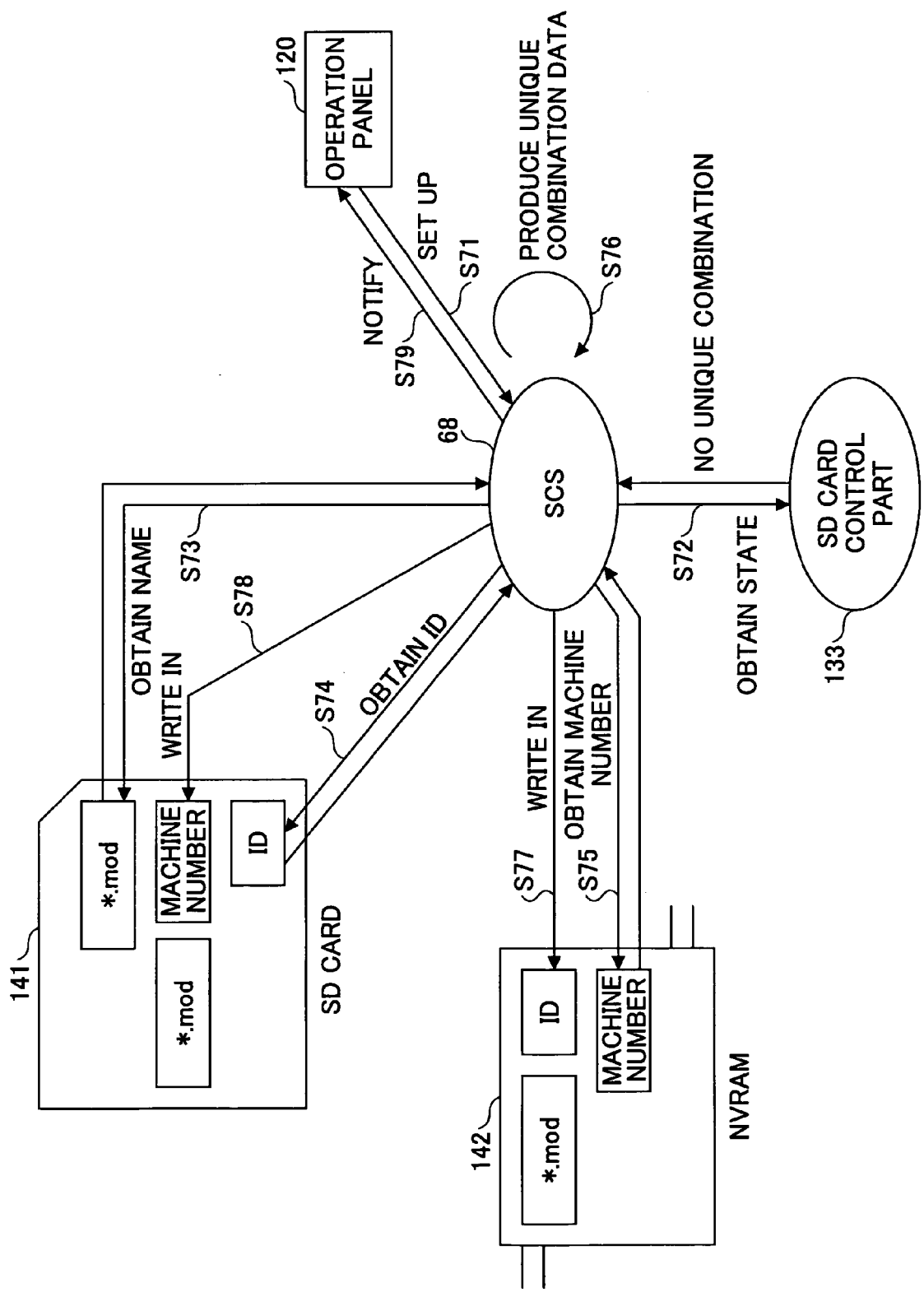

FIG. 16 shows a flow of the above-mentioned unique combination setting process.

In FIG. 16, an operator (for example, a system manager) inserts an application starting up SD card 141 to the SD card slot 110, and inputs instructions for a setting up process of setting a 'unique combination' state, to the operation panel 120 of the multifunction machine 31 (Step S71).

The SCS 68 responds to the instructions, and obtains a state of the application stating up SD card 141 thus inserted in the SD card slot 110 via the SD card control part 133 (Step S72). That is, it is determined whether or not the 'unique combination' state has been already set between the application starting up SD card 141 and the multifunction machine 31. Specifically, for example, it is determined whether not license information including the machine number of the multifunction machine 31 is already induced in the license information (see FIG. 18) written in the application starting up SD card 141. When the unique combination state has been already set, the machine number of the multifunction machine 31 should be included in the license information of the application starting up SD card 141.

When it is determined in Step S72 that the unique combination state has not been set between the multifunction machine 31 and the application starting up SD card 141, the SCS 68 starts operation to set the unique combination state. That is, first the SCS 68 obtains the name (module name) of *.mod of the 'request application' file which is the execution program included in the application adding file, from the application starting up SD card 141 inserted in the SD cared slot 110 (Step S73). Next, the SCS 68 obtains identification number ID of the application stating up SD card 141 itself (Step S74).

Next, the SCS 68 obtains the machine number of the multifunction machine 31 from the NVRAM 142 (Step S75).

Then, with the use of the information thus obtained in Steps S73, S74 and S75, the SCS 68 produces unique combination setting information (or license information) (Step S76).

The unique combination setting information includes, as described above with reference to FIG. 13, the name (module name) *.mod of the execution program 'request application' file stored in the application starting up SD card 141 and the machine number of the multifunction machine 31, to be written in the application starting up SD card 141; and also, the name of the execution program and the identification information ID of the application starting up SD card 141, to be written in the NVRAM 142 of the multifunction machine 31.

Then, the SCS 68 writes, in the NVRAM 142 of the multifunction machine 31, the thus-produced unique combination setting information to be written therein (Step S77). Next, the SCS 68 writes, in the application starting up SD card 141 inserted in the SD card slot 110, the unique combination setting information to be written therein (Step S78).

As a result, in the NVRAM 142 of the multifunction machine 31, as the unique combination setting information, in addition to the originally written machine number of the multifunction machine 31 itself, the name of the execution program and the identification information ID of the application starting up SD card 141 as the counterpart are written (i.e., the above-mentioned three types of license information). Similarly, in the application starting up SD card 141, as the unique combination setting information, in addition to the originally written identification information ID of the application starting up SD card 141 itself, the name of the execution program and the machine number of the multifunction machine 31 as the counterpart are written (i.e., the above-mentioned three types of license information).

After that, the SCS 68 displays, on the operation panel 120, that the unique combination setting process has been completed, and thus, notifies the operator of this matter (Step S79).

FIG. 17 corresponds to FIG. 16, and shows a case where already the unique combination state has been set, or, an error occurs by some cause in the Step S72.

In this case, after receiving the instructions in Step S71, the SCS 68 obtains a state of the application starting up SD card 141 inserted in the SD card slot 110 via the SD card control part 133 in Step S72. Then, when it is determined that the unique combination setting information including the machine number of the multifunction machine 31 has been already written in the application starting up SD card 141, the SCS 68 notifies the operator of the matter that the unique combination state setting has been already made, by displaying it on the operation panel 120 (Step S79).

Further, when an error occurs by some cause in Step S72 of obtaining a state of the application starting up SD card 141 inserted in the SD card slot 110, the SCS 68 notifies the operator of this matter by displaying an error message on the operation panel 120 (Step S79).

FIG. 18 illustrates the unique combination setting information written in both of the application starting up SD card 141 and the NVRAM 142 of the multifunction machine 31 as a result of the above-described unique combination setting process being carried out.

As shown in FIG. 18, through the unique combination setting process, the name (module name) of the execution program included in the application adding file and the identification information ID of the application starting up SD card 141 are read out from the application starting up SD card 141 inserted in the SD card slot 110. The information thus read out from the application starting up SD card 141 is then written in the NVRAM 142 of the multifunction machine 31. Similarly, the machine number of the multifunction machine 31 originally written in the NVRAM 142 and the name (module name) of the above-mentioned execution program of the application starting up SD card 141 are written in the application starting up SD card 141.

Thus, through the unique combination setting process, the application starting up SD card 141 and the multifunction machine 31, for which the unique combination setting is made, exchange their identification information mutually. As a result, as described with reference to FIG. 13, through a comparison or checking process with the use of the identification information therebetween upon stating up of the multifunction machine 31, whether or not unique combination setting has been already made therebetween can be positively determined. As a result, illegal execution of the execution program from the application starting up SD card 141 by an unauthorized machine can be effectively avoided.

As shown in FIG. 18, the name (module name) of the target execution program is also written, together with the identification information of the counterpart device, in the unique combination setting information (or license information). As a result, management of the unique combination setting information can be made easier. Such a configuration of the license information is especially advantageous for a case where, from one application starting up SD card 141 or from one multifunction machine 31, a unique combination setting process is made with many different multifunction machines or with many different application starting up SD cards. In such a case, as shown in FIG. 18, a plurality of sets of unique combination setting information (or license information) are written in the application starting up SD card 141 or in the NVRAM 142 of the multifunction machine 31. In this case, if only the identifying information ID of the counterpart device is written as the license information, the specific contents of the target execution program cannot be identified, whereby a management work may be complicated. By writing the name of the execution program in addition to the identification information of the counterpart device as shown in FIG. 18, such a program can be positively avoided.

Various functions may be added to the multifunction machine 31 or such, from a carriable (portable) information recording medium such as the above-mentioned application starting up SD card 141 in a form of respective execution programs. For example, a firmware for adding a function of erasing data from a hard disk drive may be stored as the execution program (i.e., 'required application' mod, mentioned above) in the application adding file of the application starting up SD card 141.

Further, the present invention is not limited to the above-described embodiments, and variations and modifications may be made without departing from the basic concept of the present invention claimed below.

The present application is based on Japanese Priority Applications Nos. 2005-061671 and 2006-038543, filed on Mar. 4, 2005 and Feb. 15, 2006, respectively, the entire contents of which are hereby incorporated herein by reference.

What is claimed is:

1. An information processing apparatus, comprising:
    a removable information recording medium having recorded thereon predetermined substance information and first license information including identification information uniquely indicating said information processing apparatus;
    a storing unit configured to store second license information including identification information uniquely indicating the removable information recording medium;
    a license checking unit configured to check license information using at least one of said first license information including the identification information uniquely indicating said information processing apparatus and said second license information including the identification information uniquely indicating the removable information recording medium; and
    a substance information usage allowability control unit configured to control, based on a result of the checking carried out by said license checking unit, allowability for a usage of said predetermined substance information from said removable information recording medium, and configured to disallow usage of said predetermined substance information from the removable information recording medium when the checking made by said license checking unit results in failure.

2. The information processing apparatus as claimed in claim 1, further comprising a license information adding unit configured to add new license information to at least one of said removable information recording medium and said storing unit.

3. The information processing apparatus as claimed in claim 1, wherein:
    said predetermined substance information comprises information which adds a new function to said information processing apparatus.

4. The information processing apparatus as claimed in claim 3, wherein:
    said information which adds a new function to said information processing apparatus includes a new execution program.

5. A control method for an information processing apparatus, comprising:
    checking license information using at least one of a first license information stored in a removable information recording medium configured to store predetermined substance information and said first license and a second license information stored in a storing unit of an information processing apparatus, wherein said first license information includes identification information uniquely indicating said information processing apparatus and said second license information includes identification information uniquely indicating said removable information recording medium; and
    controlling, using a result of the checking license information, allowability for a usage of said predetermined substance information from said removable information recording medium, including disallowing usage of said predetermined substance information from said removable information recording medium if the checking license information results in failure.

6. The control method for the information processing apparatus as claimed in claim 5, further comprising adding new license information to at least one of said removable information recording medium and said storing unit.

7. The control method for the information processing apparatus as claimed in claim 5, wherein:
    said predetermined substance information comprises information which adds a new function to said information processing apparatus.

8. The control method for the information processing apparatus as claimed in claim 7, wherein:
    said information which adds a new function to said information processing apparatus includes a new execution program.

* * * * *